US009090368B2

(12) United States Patent
Cao

(10) Patent No.: US 9,090,368 B2
(45) Date of Patent: Jul. 28, 2015

(54) SPLICING-TYPE UNLOADING DEVICE OF TUBULAR MATERIAL PACKAGING

(76) Inventor: Weilong Cao, Shanghai (CN)

( * ) Notice: Subject to any disclaimer, the term of this patent is extended or adjusted under 35 U.S.C. 154(b) by 96 days.

(21) Appl. No.: 13/824,966

(22) PCT Filed: Mar. 3, 2012

(86) PCT No.: PCT/CN2012/071900
§ 371 (c)(1),
(2), (4) Date: Mar. 18, 2013

(87) PCT Pub. No.: WO2013/029362
PCT Pub. Date: Mar. 7, 2013

(65) Prior Publication Data
US 2013/0174516 A1    Jul. 11, 2013

(30) Foreign Application Priority Data
Aug. 26, 2011   (CN) .......................... 2011 1 0247880

(51) Int. Cl.
B65G 11/00   (2006.01)
B65B 69/00   (2006.01)
B65B 61/28   (2006.01)
B65G 47/04   (2006.01)
B65G 47/90   (2006.01)

(52) U.S. Cl.
CPC ................. *B65B 69/00* (2013.01); *B65B 61/28* (2013.01); *B65G 47/04* (2013.01); *B65G 47/90* (2013.01)

(58) Field of Classification Search
CPC ......... B65B 61/28; B65G 47/04; B65G 47/20

USPC ............ 193/3, 31 R, 31 A; 198/360; 53/260, 53/381.1; 209/657
See application file for complete search history.

(56) References Cited

U.S. PATENT DOCUMENTS

| 4,027,459 | A | * | 6/1977 | Nieskens et al. | 53/500 |
|---|---|---|---|---|---|
| 4,117,647 | A | * | 10/1978 | Rossi | 53/502 |
| 6,006,501 | A | * | 12/1999 | Davis et al. | 53/451 |
| 6,254,911 | B1 | * | 7/2001 | Komatsu | 426/393 |
| 6,564,927 | B2 | * | 5/2003 | Meyer | 198/528 |
| 6,761,016 | B1 | * | 7/2004 | Soleri | 53/554 |
| 6,826,892 | B2 | * | 12/2004 | Basque et al. | 53/410 |
| 2002/0014055 | A1 | * | 2/2002 | Iwasa et al. | 53/551 |

* cited by examiner

Primary Examiner — William R Harp
(74) Attorney, Agent, or Firm — Raymond Y. Chan; David and Raymond Patent Firm

(57) ABSTRACT

A splicing type unloading device, which is used for a pillow-type automatic packaging machines for tubular material, includes a discharging device having a row of discharge orifices for discharging well packaged bags respectively, a plurality of holding devices aligned side-by-side below the discharging device, a splicer inclindedly positioned below the holding devices to be horizontally moved, and a conveyor belt positioned below the splicer. An inlet of the splicer is positioned above an outlet thereof to serve as a slider. The splicer is horizontally moved to align the inlet thereof right below the discharging device for the packaged bags being downwardly dropped from the holding devices to the inlet. The splicer is then horizontally moved to align the outlet thereof with the conveyor belt for transferring the packaged bags from the splicer to the conveyor.

10 Claims, 4 Drawing Sheets

SPLICING-TYPE UNLOADING DEVICE OF TUBULAR MATERIAL PACKAGING

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a pillow-type packaging machine, and more particularly to a splicing-type unloading device for tubular material packaging.

2. Description of Related Arts

Pillow-type packaging methods of the prior art are to seal both sides of a flat material along the longitudinal direction to form a cavity, all the while putting an object to be packaged into the cavity. The shape of a well packaged objects looks like a pillow, and so named as a pillow-type packaging. The entire packaging process has a high degree of automation at a fast speed which is suitable for bulk, granular, powder, or liquid objects such as biscuits, pies, chocolates, breads, instant noodles, the Chinese traditional food "moon cake", soybean milk, milk, soy sauce, cooking wine, or arrowroot flour. All these products can in turn be used for all kinds of daily necessities, industrial parts, medical devices and the like. A number of patents and conventional technologies associated with the pillow-type packaging machine have been disclosed.

It is expected that the pillow-type packaging method intends to seal flaky material to form a cavity structure, wherein the object to be packaged is put into the cavity for packaging; however, this kind of packaging also brings the following disadvantages of: 1. wasting materials such that the conventional pillow-type packaging machine is provided to package objects after sealing both sides of the flaky material, wherein the sealing part needs a considerable number of packaging materials 2. influencing the appearance such that the seams remaining and stacked outside the packaging bag impact the appearance of the packaging bag; 3. the expensive cost such that in the forming process multilayer composite materials required to make the package have a high cost; 4. adding extra procedures such that the processing steps which make a pillow-type flaky material packaging are increased, and thus the energy consumption and labor costs are increased as well relative to the tubular material packaging.

Compared with the flaky material packaging process, the packaging process using a tubular material does not need multilayer composite materials, and does not generate an intermediate suture portion. Accordingly, the advantages of the packing process using a tubular material are a beautiful appearance, energy saving, and a lower cost.

Furthermore, there are considerable differences in the unloading process if comparing with tubular material packaging methods with flaky material packaging: 1. for flaky material packaging, a plurality of objects to be packed can be placed into a piece of the packaging material, sealed, and then cut and transferred during the horizontal forward operation. In other words, the unloading of the objects being packed can be done after forward operation, that is, the procedures for packaging and unloading objects can be completed at different positions. The unloading of the objects to be packed for a tubular material packaging-type is done after filling and sealing, wherein the objects are placed into the base of the transparent vertical tubes. In other words, after the packaging process is completed, the objects are prevented from vertically dropping since a vertical drop will affect the next process. It is also necessary to change the position of a well packaged product in order to unload them. 2. For a flaky packaging material type, which can be moved forward continuously, as long as just one piece of flaky packaging material is moving, the packaging speed is capable of being satisfied as requested. Whereas for a tubular material packaging type, as long as the previous packaging bag is unloaded, the next step can be conducted. This type needs that at least four unloading operations done simultaneously to meet the requirements for the packaging speed. This creates the problem of how to make the object to be packaged transferred smoothly onto the conveyor belt.

Although a solution using rotary unloading method is disclosed in the Chinese patent application "an automatic packaging machine of a disposable syringe" (CN200820162320.7), the disadvantages of a complicated structure and poor reliability create problems.

SUMMARY OF THE PRESENT INVENTION

The present invention provides a splicing-type unloading device for tubular packaging material in which well packaged bags that are below a row of discharge orifices are respectively transferred onto conveyor belts simultaneously. Another advantage of the invention is to The present invention is to provide a solution to remedy the aforementioned drawback proposed according by the present invention such that a holding device, capable of opening and closing, is configured beside a packaging bag below a discharge device, wherein this discharge device has a holding member, and the amount and position of which are the same as that of discharge orifice of the discharge device respectively. When closed, each holding member can hold one packaging bag.

A splicer is configured below a holding device, which is inclined to serve as a slider. An inlet of the splicer is below the holding device, and an outlet of the splicer is above a conveyor belt. The splicer can shift in a horizontal direction. The splicer is not right below the packaging bag, but situated on the side of packaging bag. After the packaging bag is packaged, the inlet of the splicer shifts under the holding device, and then the holding member is released to drop the packaging bag onto the conveyor belt for transfer. When completed, the splicer reverts back to the original position.

A splicer is configured below a holding device, which is inclined to serve as a slider. An inlet of the splicer is below the holding device, and an outlet of the splicer is above a conveyor belt. The splicer can shift in a horizontal direction. The splicer is not right below the packaging bag, but situated on the side of packaging bag. After the packaging bag is packaged, the inlet of the splicer shifts under the holding device, and then the holding member loosens to drop the packaging bag onto the conveyor belt for transfer. When completed, the splicer reverts back to the original position. Still further objects and advantages will become apparent from a consideration of the ensuing description and drawings.

The advantages obtained by present invention are such that the objects being packed come downward from an upper position into a packaging bag, wherein the holding device holds the packaging bag. Accordingly, it is not only possible to make the open-end detached from the orifice fixing device, but also can also press the air in the packaging bag out.

Figure 1:
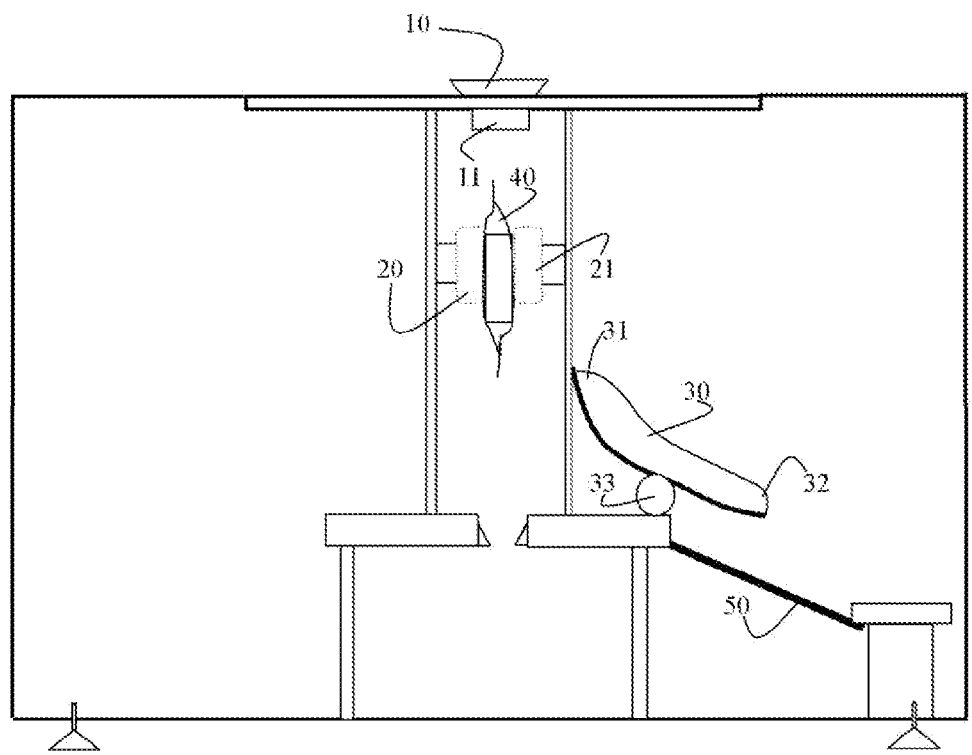
FIG. 1 is a schematic side view of the initial state of a present embodiment.

The drawing symbols are described as follows: 10: discharge device; 11: discharge orifice; 20: holding device; 21: holding member; 30: splicer; 31: inlet; 32: outlet; 33: shifter; 40: packaging bag; 50: conveyor belt;

There are five of discharge orifices and five of holding members that form five unloading units. The number of the unloading units according to the present invention are not limited to five, but can be greater or less than five.

The operation of each member in the present embodiment can be completed by selecting electric or pneumatic member, but for the purpose of a simple illustration the power supply and the motive power will not be described hereinafter and in the drawings.

DETAILED DESCRIPTION OF THE PREFERRED EMBODIMENT

FIG. 1 is a schematic side view of the initial state of a present embodiment. As illustrated, a row of discharge orifices 11 are configured above the discharge device 10, and the packaged bags 40 are dropped below discharge orifices 11, and the holding devices 20 are positioned below the discharge orifices 11 and are aligned in a column manner, respectively. In respect to the side view, only a packaging bag 40 and a holding member (splicer member) 21 are seen. A holding member 21, corresponding to two sides of a packaging bag 40, is capable of opening and closing in the horizontal direction. When the holding member 21 is closed, each of the holding members 21 can hold one of the packaging bag 40. As illustrated in FIG. 1, the holding members 21 hold a packaging bag 40. A splicer 30 is positioned below a the holding device 20, which is inclined to serve as a slider and has an inlet 31 and an outlet 32 thereon. The inlet 31 is positioned above the outlet 32, and the outlet 32 of the splicer 30 is situated on the side of the conveyor belt 50. A splicer 30 is connected with a shifter 33 to shift the splicer 30 in a horizontal direction. An inlet 31 of the splicer 30 is normally not right below a discharge orifice 11, which shifts forth and back between a normal position and a position right below the discharge orifice 11. A conveyor belt 50 is positioned below a splicer 30, and the position of the conveyor belt 50 is not right below the holding device 20, but is on the side of the holding device 20.

Figure 2:
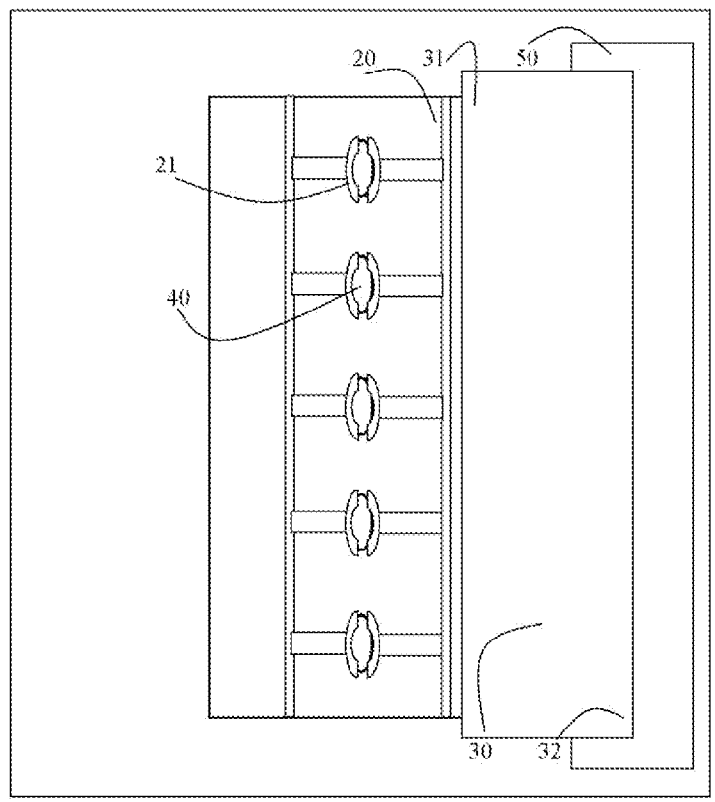
FIG. 2 is a schematic sectional view of the initial state of the present embodiment.

FIG. 2 is a schematic plan sectional view of the initial state of the present embodiment. As is shown in FIG. 2, five of the holding devices 21 and five of the packaging bags 40 are arranged side by side, and the width of an inlet 31 of the splicer 30 is greater than the width of a holding device 20. Outlet 32 is an outlet, and conveyor belt 50 is a conveyor belt.

Figure 3:
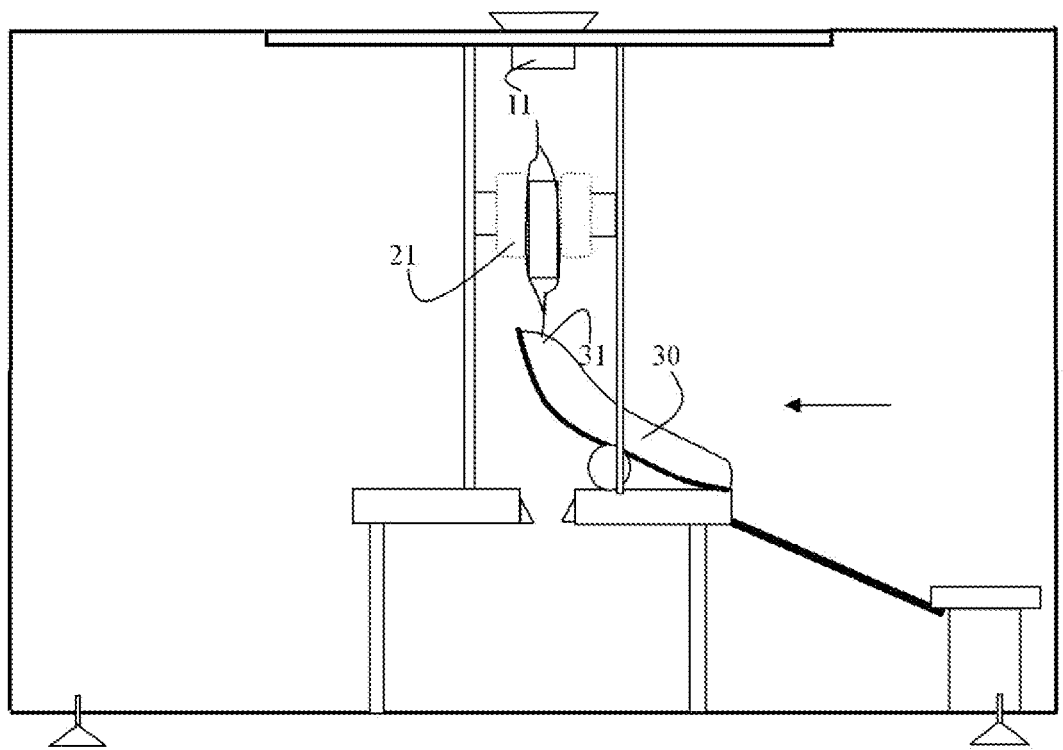
FIGS. 3~7 are the schematic side views of the operation state of the present embodiment.

FIG. 3 shows the first operating step of the device according to the present invention. FIG. 3 is a schematic diagram of an inlet 31 of the splicer 30, which has reached a position right below a holding member 21. The inlet 31 of the splicer 30 is shifted right below a holding member 21, and right below the outer discharge orifice 11 in the direction indicated by an arrow.

Figure 4:
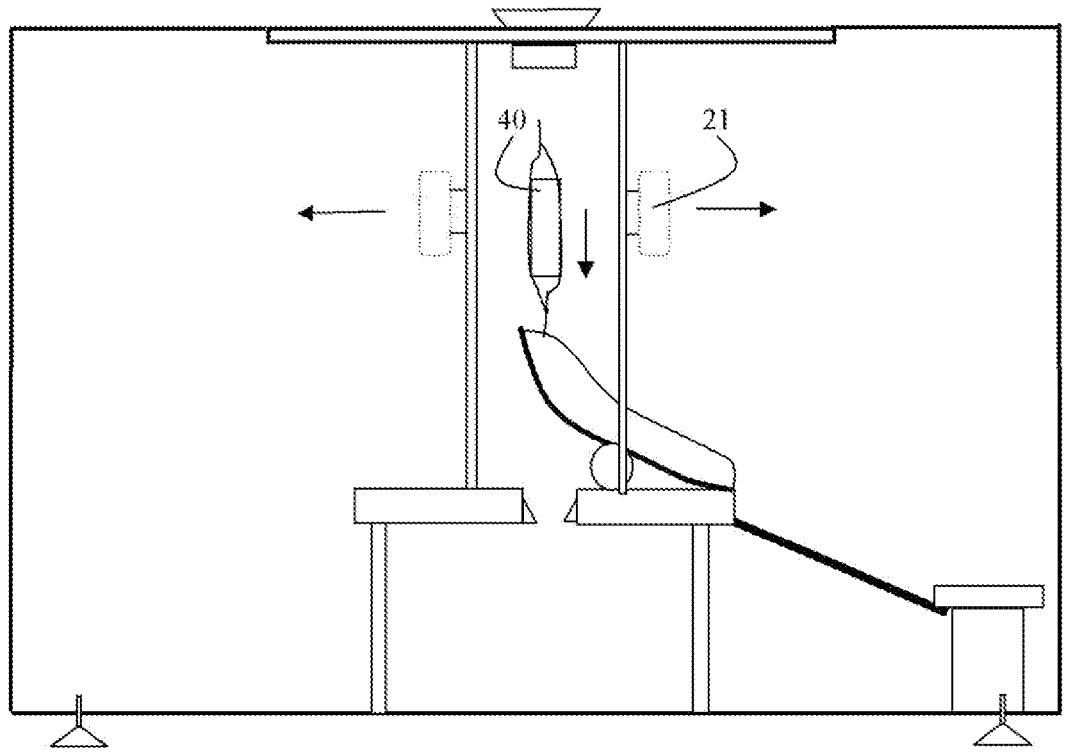

FIG. 4 shows the second operating step of the device according to the present invention. FIG. 4 is a schematic diagram of a holding member 21 which has a loose grip on a packaging bag 40. The holding member 21 is opened along the direction indicated by an arrow, wherein a packaging material 40 begins to drop downward.

Figure 5:
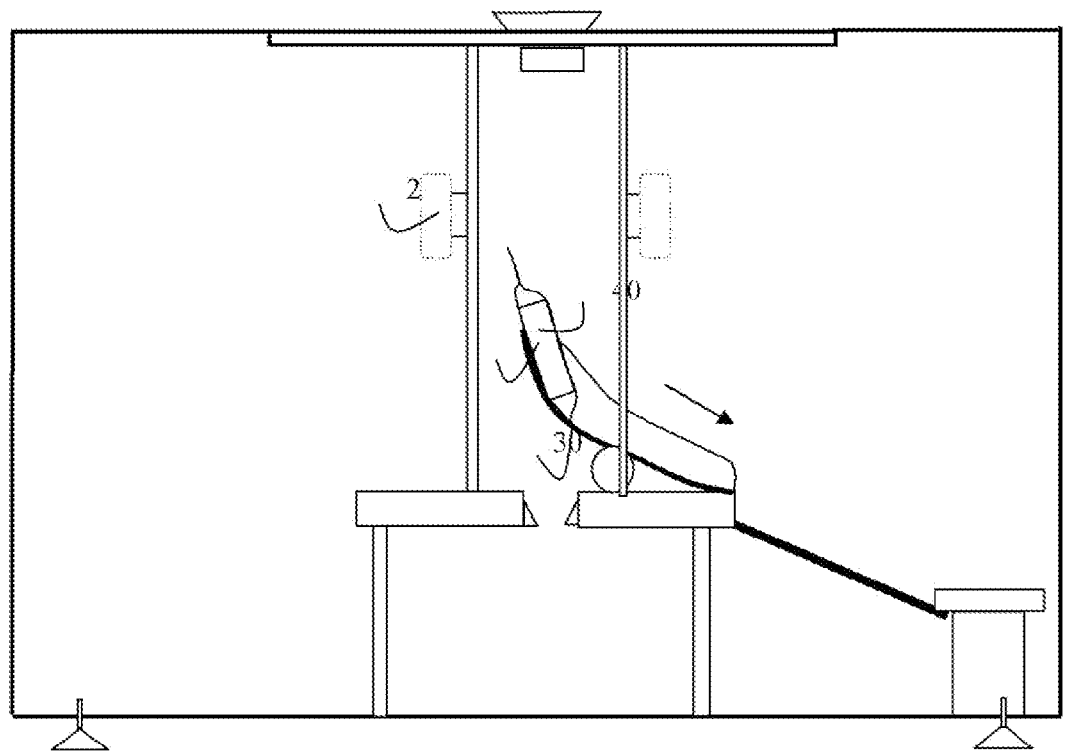

FIG. 5 shows the third operating step of the device according to the present invention. FIG. 5 is a schematic diagram of the packaging bag 40 which is dropping onto an conveyor belt 50. After holding devices 21 opens, the packaging bag 40 drops down onto an inlet 31 of the splicer 30.

Figure 6:
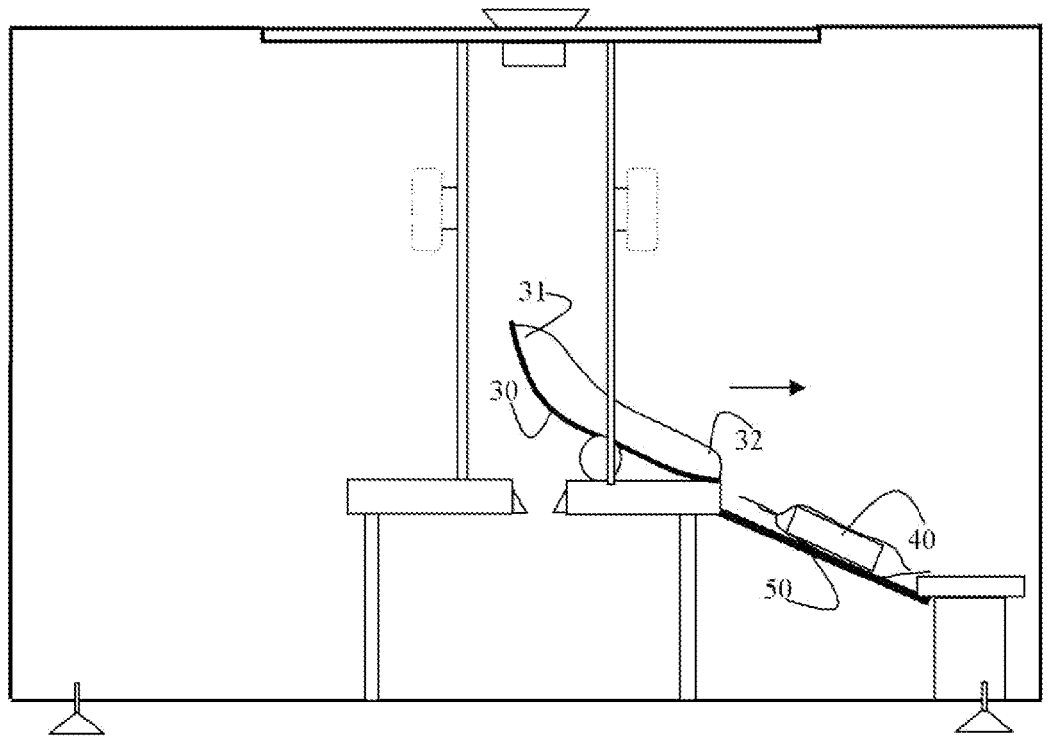

FIG. 6 shows the forth operating step of the device according to the present invention. FIG. 6 is a schematic diagram of a packaging bag 40 which has dropped onto a conveyor belt 50. A splicer 30 is inclined to serve as a slider, wherein the packaging bag 40 drops into an inlet 31 of the packaging bag 40, and then slips onto the conveyor belt 50 below the inlet 31 and through an outlet 32.

Figure 7:
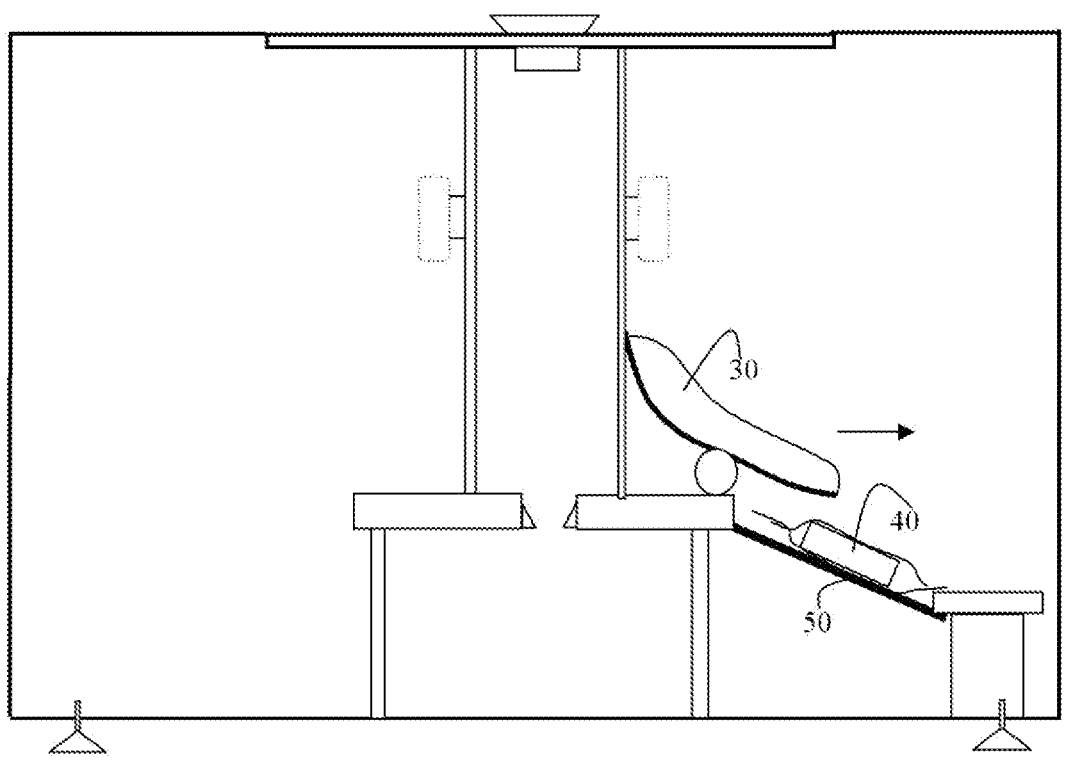

FIG. 7 shows the fifth operating step of the device. FIG. 7 is a schematic diagram of the splicer 30 returning to its original position. After the packaging bag 40 has slipped onto the conveyor belt 50, the splicer 30 begins to return to its original position along the direction indicated by an arrow.

What is claimed is:

1. A splicing type unloading device of the tubular material packaging, comprising:

a discharging device having a row of discharge orifices for discharging a plurality of tubular objects packed in a plurality of packaging bags respectively;

a plurality of holding devices which are positioned below said discharging device and are aligned side-by-side, wherein each of said holding devices comprises a plurality of holding members being moved between a closed state and an opened state, wherein in said closed state, said holding members of said holding devices are arranged for gripping said packaging bags discharged from said discharge orifices respectively, and in said opened state, said holding members of said holding devices are moved for releasing said packaging bags to enable said packing bags to be dropped downwardly;

a splicer, having an inlet and an outlet, which is inclindedly positioned below said holding devices and is horizontally moved between a first position and a second position, wherein said inlet of said splicer is positioned above said outlet thereof to serve as a slider for guiding said packaging bags from said inlet to said outlet, wherein in said first position, said splicer is horizontally moved to align said inlet thereof right below said discharging device for enabling said packaging bags being downwardly dropped from said holding devices to said inlet; and a conveyor belt positioned below said splicer, wherein in said second position, said splicer is horizontally moved to align said outlet thereof with said conveyor belt for transferring said packaging bags from said splicer to said conveyor.

2. The splicing type unloading device of the tubular material packaging, as recited in claim 1, wherein said holding members of each of said holding devices are moved horizontally between said closed state for gripping two sides of said packaging bag and said opened state for enabling said packaging bag to be dropped downwardly.

3. The splicing type unloading device of the tubular material packaging, as recited in claim 2, wherein a width of said inlet of said splicer is greater than a width of said holding device.

4. The splicing type unloading device of the tubular material packaging, as recited in claim 3, further comprising a shifter connected to said splicer to horizontally shift said splicer back and forth between said first position and said second position.

5. The splicing type unloading device of the tubular material packaging, as recited in claim 4, wherein said outlet of said splicer is situated on a side of said conveyor belt.

6. The splicing type unloading device of the tubular material packaging, as recited in claim 3, wherein said outlet of said splicer is situated on a side of said conveyor belt.

7. The splicing type unloading device of the tubular material packaging, as recited in claim 2, further comprising a shifter connected to said splicer to horizontally shift said splicer back and forth between said first position and said second position.

8. The splicing type unloading device of the tubular material packaging, as recited in claim 1, wherein a width of said inlet of said splicer is greater than a width of said holding device.

9. The splicing type unloading device of the tubular material packaging, as recited in claim 1, further comprising a shifter connected to said splicer to horizontally shift said splicer back and forth between said first position and said second position.

10. The splicing type unloading device of the tubular material packaging, as recited in claim 1, wherein said outlet of said splicer is situated on a side of said conveyor belt.

\* \* \* \* \*